United States Patent
Fink et al.

(10) Patent No.: US 10,658,686 B2
(45) Date of Patent: May 19, 2020

(54) FREEZE TOLERANT FUEL CELL FUEL PRESSURE REGULATOR

(75) Inventors: Garrett W. Fink, Glastonbury, CT (US); David Melo Ferreira, Glastonbury, CT (US); Christopher John Carnevale, Vernon, CT (US)

(73) Assignee: AUDI AG, Ingolstadt (DE)

( * ) Notice: Subject to any disclaimer, the term of this patent is extended or adjusted under 35 U.S.C. 154(b) by 1164 days.

(21) Appl. No.: 13/976,105

(22) PCT Filed: Feb. 3, 2011

(86) PCT No.: PCT/US2011/023559
§ 371 (c)(1),
(2), (4) Date: Jun. 26, 2013

(87) PCT Pub. No.: WO2012/105975
PCT Pub. Date: Aug. 9, 2012

(65) Prior Publication Data
US 2013/0273448 A1  Oct. 17, 2013

(51) Int. Cl.
*H01M 8/04* (2016.01)
*H01M 8/04082* (2016.01)
(Continued)

(52) U.S. Cl.
CPC ..... *H01M 8/04082* (2013.01); *H01M 8/0273* (2013.01); *H01M 8/04225* (2016.02);
(Continued)

(58) Field of Classification Search
CPC .......... H01M 8/04082; H01M 6/5038; H01M 8/04007; H01M 8/04223; H01M 8/04253;
(Continued)

(56) References Cited

U.S. PATENT DOCUMENTS 3,961,986 A  6/1976 Waldman
6,562,503 B2  5/2003 Grasso et al.
(Continued)

FOREIGN PATENT DOCUMENTS

CN  1930714 A  3/2007
CN  101689622 A  3/2010
(Continued)

OTHER PUBLICATIONS http://www.engineering-dictionary.org/Boss; 2008.*
International Search Report for PCT Application No. PCT/US2011/023559, dated Nov. 22, 011.

*Primary Examiner* — Jonathan G Jelsma
*Assistant Examiner* — Omar M Kekia
(74) *Attorney, Agent, or Firm* — Seed Intellectual Property Law Group LLP

(57) ABSTRACT

A fuel pressure regulator unit is mounted on a manifold. The fuel pressure regulator unit includes a housing providing a fuel inlet passage, a regulated fuel outlet passage, a sense pressure passage, a recycle passage and a mixed fuel passage. A pressure regulator is provided in the housing and is arranged fluidly between the fuel inlet passage and the regulated fuel outlet passage. The sense passage fluidly interconnects the mixed fuel passage and the pressure regulator. The pressure regulator is configured to regulate the flow of fuel from the fuel inlet passage to regulated fuel passage in response to a pressure from the sense pressure passage. An ejector is arranged within the housing and fluidly between the regulated fuel outlet passage and the mixed fuel passage. An ejector is configured to receive recycled fuel from the recycle passage.

5 Claims, 4 Drawing Sheets

(51) Int. Cl.
*H01M 8/04225* (2016.01)
*H01M 8/0273* (2016.01)
*H01M 8/2475* (2016.01)
*H01M 8/04223* (2016.01)
*F04F 5/54* (2006.01)
*G05D 16/06* (2006.01)
*F04F 5/16* (2006.01)
*F04F 5/00* (2006.01)
*H01M 8/04007* (2016.01)
*H01M 8/04089* (2016.01)

(52) U.S. Cl.
CPC ..... *H01M 8/04253* (2013.01); *H01M 8/2475* (2013.01); *F04F 5/00* (2013.01); *F04F 5/16* (2013.01); *F04F 5/54* (2013.01); *G05D 16/0655* (2013.01); *H01M 8/04007* (2013.01); *H01M 8/04097* (2013.01); *Y02E 60/50* (2013.01)

(58) Field of Classification Search
CPC .... H01M 8/2475; H01M 8/04097; F04F 5/00; F04F 5/16; F04F 5/54; G05D 16/0655; Y02E 60/50
USPC ......................................... 429/434, 436, 443
See application file for complete search history.

(56) References Cited

U.S. PATENT DOCUMENTS

| | | |
|---|---|---|
| 6,777,115 B2 | 8/2004 | Reiser |
| 7,282,285 B2 | 10/2007 | Couch et al. |
| 7,282,290 B2 | 10/2007 | Perry et al. |
| 7,320,840 B2 | 1/2008 | Pechtold et al. |
| 7,687,171 B2 | 3/2010 | Ban et al. |
| 2003/0022037 A1* | 1/2003 | Parr ................ H01M 8/04223 429/429 |
| 2003/0054209 A1* | 3/2003 | Gillett .............. H01M 8/04231 429/425 |
| 2003/0199387 A1* | 10/2003 | Saito ................. H01M 4/8885 502/101 |
| 2004/0081869 A1 | 4/2004 | Morishima et al. |
| 2004/0101734 A1 | 5/2004 | Morishima et al. |
| 2005/0112428 A1* | 5/2005 | Freeman ............ B60L 11/1881 429/430 |
| 2005/0147863 A1 | 7/2005 | Hiramatsu et al. |
| 2005/0208357 A1 | 9/2005 | Bitzer et al. |
| 2006/0081290 A1* | 4/2006 | Sachs ...................... F17C 7/00 137/340 |
| 2006/0088745 A1* | 4/2006 | Kanno ............. H01M 8/04223 429/414 |
| 2006/0127722 A1 | 6/2006 | Nakajima et al. |
| 2008/0038608 A1 | 2/2008 | Yoshida |
| 2008/0063902 A1* | 3/2008 | Kawasaki ......... H01M 8/04007 429/10 |
| 2010/0047665 A1 | 2/2010 | Takeshita et al. |
| 2010/0068565 A1 | 3/2010 | Yadha et al. |
| 2010/0221623 A1* | 9/2010 | Pabst ................ H01M 8/04089 429/428 |
| 2013/0209910 A1* | 8/2013 | Horn et al. ................. 429/436 |

FOREIGN PATENT DOCUMENTS

| | | |
|---|---|---|
| JP | 2004-95528 A | 3/2004 |
| JP | 2007-5037 A | 1/2007 |
| JP | 2007-83860 A | 4/2007 |
| JP | 2008-262894 A | 10/2008 |
| JP | 2009-238429 A | 10/2009 |
| JP | 2010-539634 A | 12/2010 |
| WO | 2008-076112 | 6/2008 |
| WO | WO2011141554 A1 * | 11/2011 |

* cited by examiner

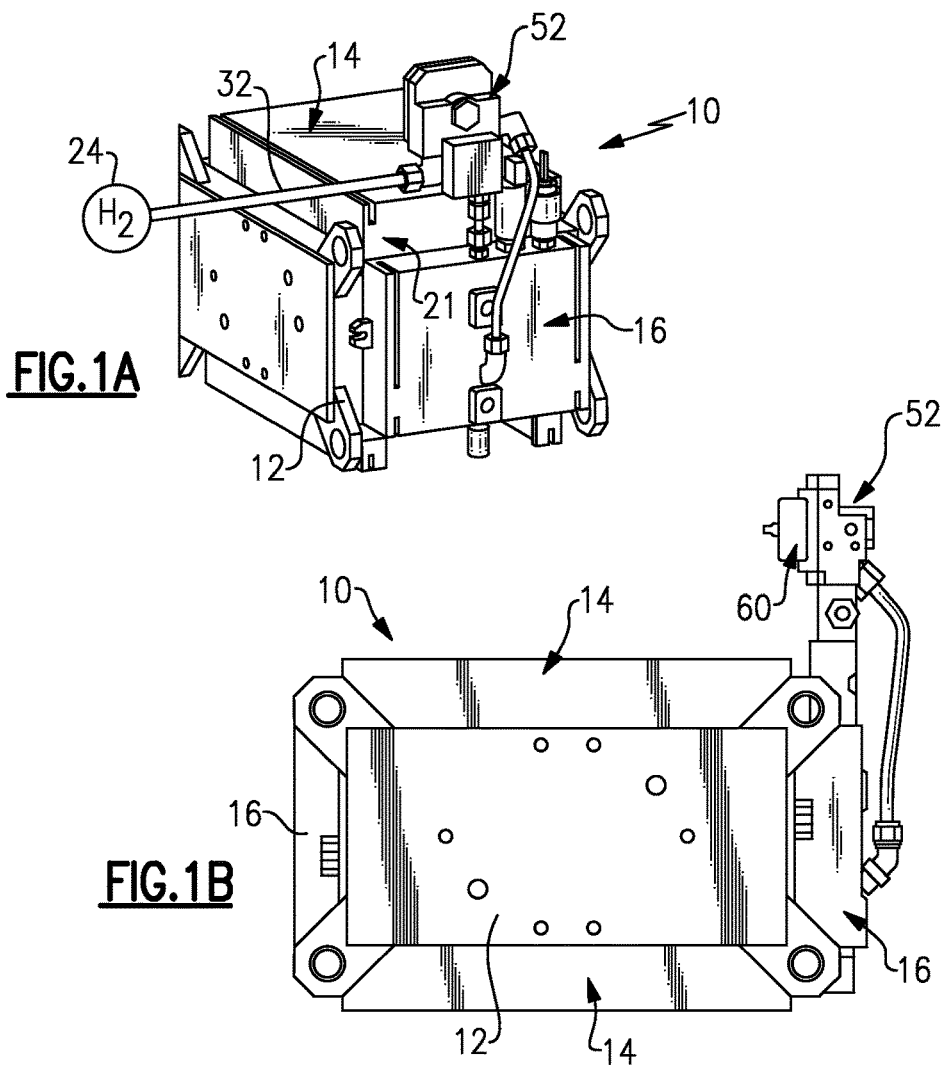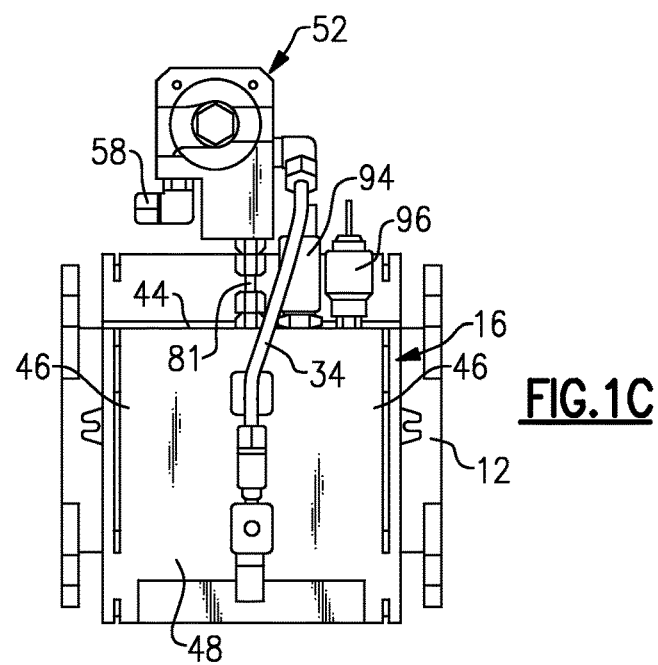

FREEZE TOLERANT FUEL CELL FUEL PRESSURE REGULATOR

This application is a United States National Phase of PCT Application No. PCT/US2011/023559 filed on Feb. 3, 2011.

BACKGROUND

This disclosure relates to a fuel cell pressure regulator system using recycled fuel. More specifically, the disclosure relates to a freeze tolerant fuel cell pressure regulator unit and fuel recycle line.

A fuel cell includes an anode and a cathode that respectively receives a fuel and an oxidant, such as hydrogen and air. Some fuel cells incorporate a fuel recycle line in which unused hydrogen from the fuel cell anode is recirculated back to an anode inlet.

Water is a byproduct of the chemical reaction within the fuel cell, and water may also be used as a coolant within the fuel cell. Depending upon the type of separator plate used within the fuel cell, the recycled fuel may be laden with moist air. Accordingly, various features within the fuel cell may become frozen in cold weather conditions. If ice blocks certain passages within the fuel cell, the fuel cell cannot be restarted. The fuel cell must also be capable of being started in freezing conditions at various tilt angles to which a vehicle may be commonly subjected.

SUMMARY

A fuel cell is disclosed having a fuel cell stack including an anode and a cathode. The anode and cathode are configured to respectively receive a fuel and an oxidant. A manifold is in fluid communication with the anode.

In one example, a fuel pressure regulator unit is mounted on the manifold. The fuel pressure regulator unit includes a housing providing a fuel inlet passage, a regulated fuel outlet passage, a sense pressure passage, a recycle passage and a mixed fuel passage. A pressure regulator is provided in the housing and is arranged fluidly between the fuel inlet passage and the regulated fuel outlet passage. The sense passage fluidly interconnects the mixed fuel passage and the pressure regulator. The pressure regulator is configured to regulate the flow of fuel from the fuel inlet passage to regulated fuel outlet passage in response to a pressure from the sense pressure passage. An ejector is arranged within the housing and fluidly between the regulated fuel outlet passage and the mixed fuel passage. An ejector is configured to receive recycled fuel from the recycle passage.

BRIEF DESCRIPTION OF THE DRAWINGS

The disclosure can be further understood by reference to the following detailed description when considered in connection with the accompanying drawings wherein:

FIG. 1A is a perspective view of an example fuel cell assembly.

FIG. 1B is a side elevational view of the fuel cell assembly illustrated in FIG. 1A.

FIG. 1C is an end view of the fuel cell assembly illustrated in FIG. 1A.

DETAILED DESCRIPTION

An example fuel cell assembly 10 is illustrated in FIGS. 1A-1C. The fuel cell assembly 10 includes a fuel cell stack 21 supported by a frame 12, which is used to secure the fuel cell assembly 10 to a vehicle. The fuel cell assembly 10 includes first and second manifolds 14, 16 that are used to communicate the reactant, oxidant, and/or coolant within the fuel cell assembly 10 as desired.

Figure 2:
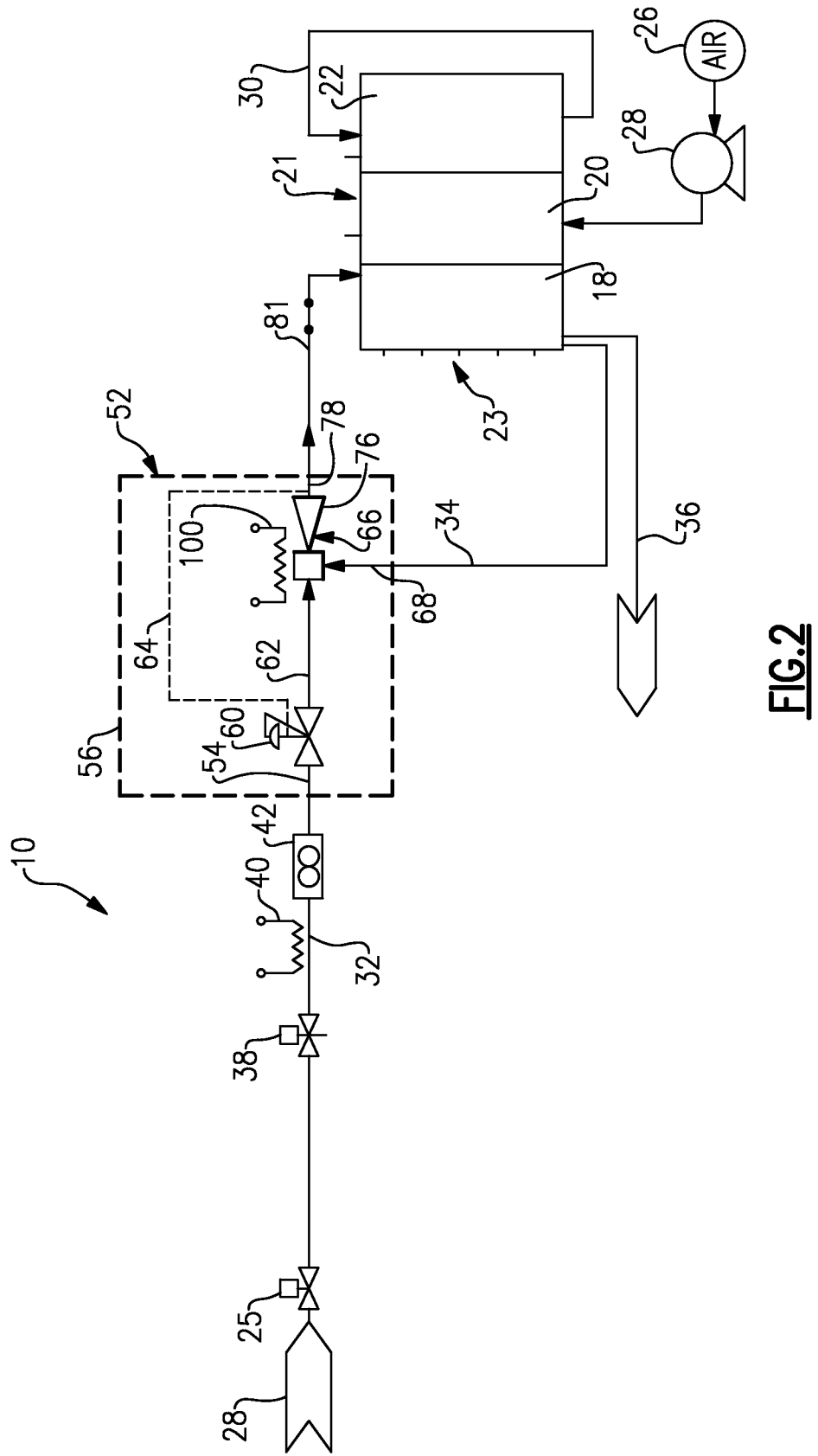
FIG. 2 is a highly schematic view of the fuel cell, a fuel pressure regulator unit, and various fluid lines, including a recycle line.

Referring to the schematic illustration of the fuel cell assembly 10 in FIG. 2, the fuel cell stack 21 includes an anode 18, a cathode 20 and a cooler 22. The first and second manifolds are secured to the fuel cell stack 21. The anode 18 receives reactant or fuel, for example, from a hydrogen source 24, through a reactant line 32. Unused hydrogen may be expelled through a recycle line 34 to be mixed with unused hydrogen before being supplied again to the anode 18. The recycle line 34 is generally vertical with no 90° bends to ensure that water or ice does not accumulate within the recycle line 34. An oxidant, such as air 26, is supplied to the cathode 20 by a pump 28. A coolant loop 30 circulates coolant within the fuel cell assembly 10 to maintain the fuel cell stack 21 at a desired operating temperature.

Hydrogen from the hydrogen source 24 has a high pressure that is reduced to a lower pressure before being supplied to the reactant line 32. In one example, a fuel pressure valve 25 is provided in close proximity to the hydrogen source 24. A control valve 38 is arranged downstream from the fuel pressure valve 25 and meters the flow of hydrogen to a fuel pressure regulator unit 52. A heater 40 and a temperature sensor 42 is used to heat and regulate the temperature of the hydrogen prior to reaching a fuel pressure regulator unit 52, such that heated hydrogen is provided to the fuel cell stack 21 to improve its operating efficiency.

Returning to FIGS. 1A-1C, the second manifold 16 is used to distribute hydrogen fuel into and out of the anode 18 within the fuel cell stack 21. The second manifold 16 includes upper and lower walls 44, 48 joined to one another by side walls 46. An outer vertical wall 50 adjoins the upper, side and lower walls 44, 46, 48. The fuel pressure regulator unit 52 is arranged above the upper wall 44 in an installed orientation (shown in FIGS. 1A-1C) to encourage water to drain from the fuel pressure regulator unit 52 through line 81 under a variety of tilt angles.

Figure 3:
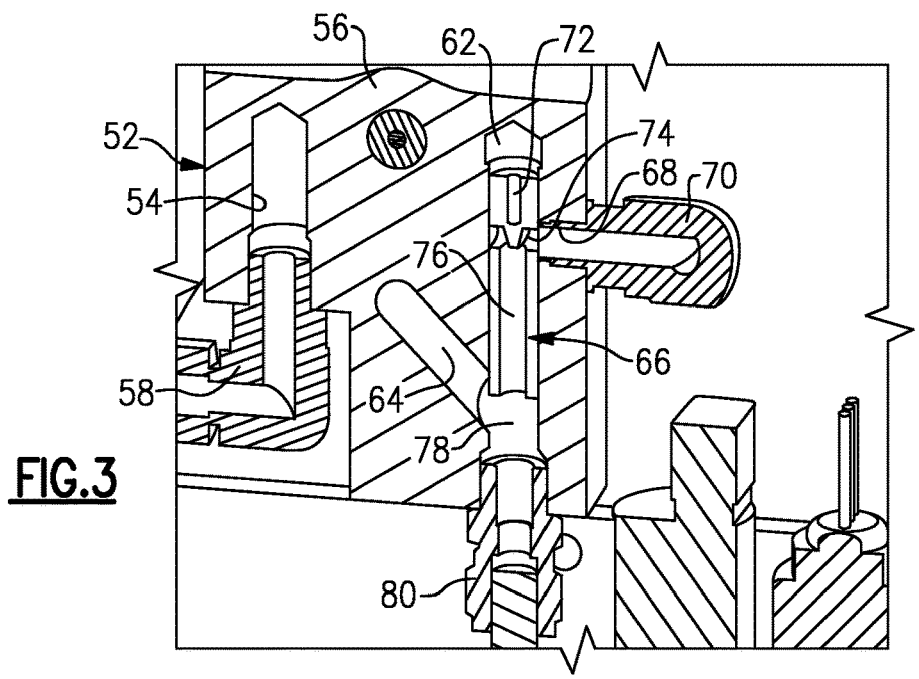
FIG. 3 is a partial cross-sectional view of the pressure regulator unit.

The fuel pressure regulator unit 52 is shown in more detail in FIGS. 2 and 3. A variety of passages are integrated into a common housing 56 to provide a compact fuel pressure regulator unit 52 that may be heated by a common, relatively small heater 100, which is schematically illustrated in FIG. 2. The fuel pressure regulator unit 52 includes a fuel inlet passage 54 that communicates hydrogen from the reactant line 32 through a fuel inlet supply fitting 58 secured to the housing 56 at the fuel inlet passage 54. A fuel pressure regulator 60, which may include a diaphragm and spring, is provided between the fuel inlet passage 54 and a regulated fuel outlet passage 62 that provides pressure regulated hydrogen in response to a pressure input from a sense pressure passage 64 within the housing 56. The sense pressure passage 64 is provided within the housing 56 at an angle when the housing 56 in the installed orientation, which is illustrated in FIGS. 1A-1C.

An ejector 66 is arranged within the housing 56, generally vertically, downstream from the regulated fuel outlet passage 62. The ejector 66 receives recycled hydrogen via a recycle passage 68 within the housing 56. A recycle fitting 70 is secured to the housing at the recycle passage 68 and supplies the recycled hydrogen from the recycle line 34. The recycle fitting 70 is angled downward at approximately a 45° angle to drain water out of the housing 56. The ejector 66 receives the regulated fuel from the fuel pressure regulator 60, which mixes with the recycled hydrogen at a recycle fuel inlet 74 before being expelled through a diffuser section 76 of the ejector 66. The mixed pressure regulated fuel and recycle fuel is provided from the ejector 66 to a mixed fuel passage 78. The sense pressure passage 64 is fluidly connected between the mixed fuel passage 78 and the fuel pressure regulator 60. A fuel outlet fitting 80, which is oriented vertically, is secured to the housing 56 at the mixed fuel passage 78 and supplies the hydrogen to the second manifold 16 at the upper wall 44.

Figure 4:
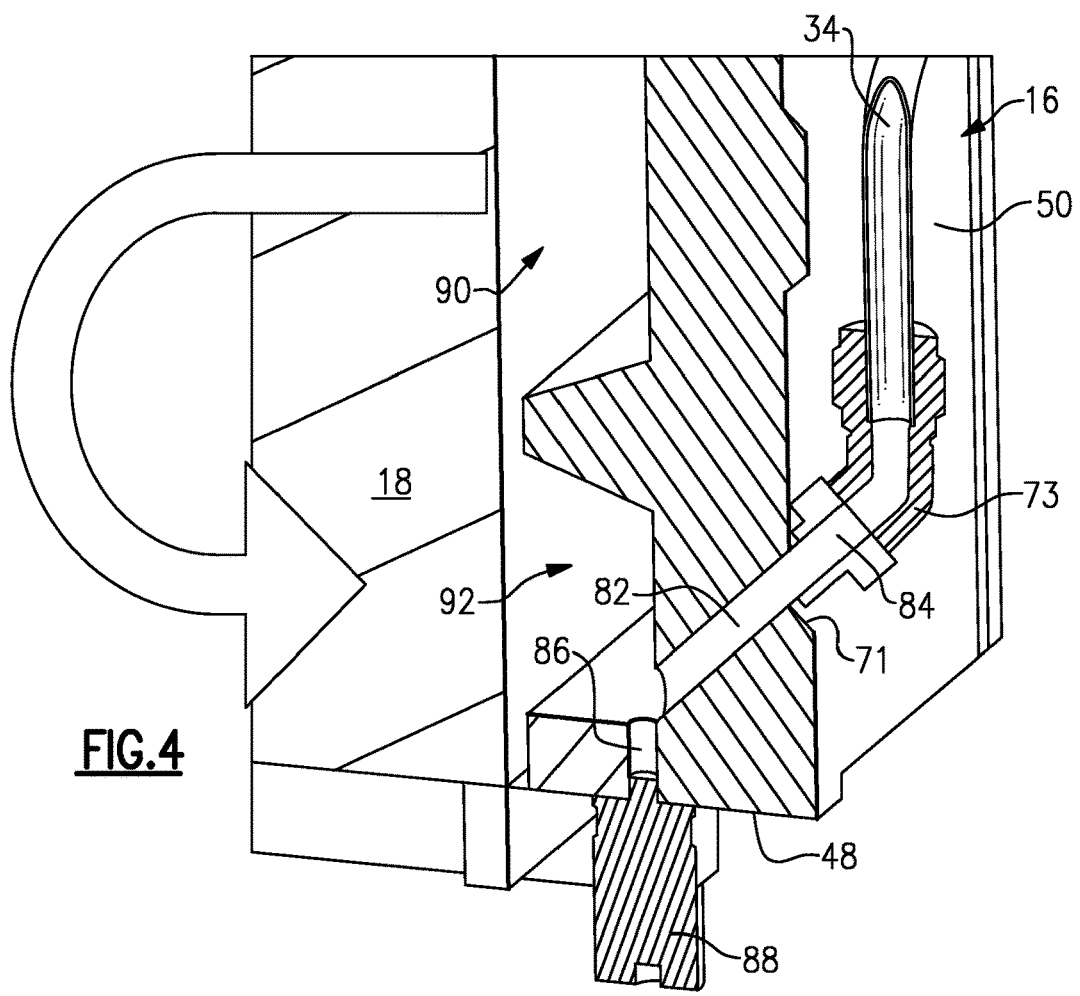
FIG. 4 is a partial cross-sectional view of a portion of a manifold and the recycle line.

The second manifold 16 is illustrated in more detail in FIG. 4. The example second manifold 16 includes an inlet portion 90 and outlet portion 92 that communicates hydrogen with the anode 18 having anode passages, which double-back, as schematically illustrated by the large arrow. That is, the manifold opposite the second manifold 16 acts as a return. The recycle line 34 includes a fitting 73 secured to a boss 71 provided on the second manifold 16. The passage 82 within the fitting 73 and the passage 84 within the boss 71 are positioned at an angle above horizontal, for example at 45°, in the installed orientation to encourage water to drain from the recycle line 34. A purge passage 86 is provided in the lower wall 48. A purge valve 88 is secured to the lower wall 48 at the purge passage 86 and can be activated to drain water from the second manifold 16.

Referring to FIG. 1C, a hydrogen concentration sensor 94 and a fuel inlet pressure sensor 96 are provided on the upper wall 44 in a vertical orientation to enable water to drain from these locations.

Figure 5A:
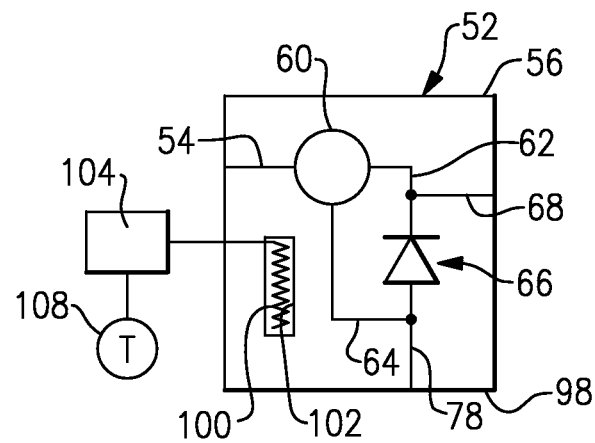
FIG. 5A is a highly schematic view of one example fuel pressure regulator unit with an internal heater.

The fuel pressure regulator unit 52 is compact to enable it to be more easily heated. As schematically illustrated in FIG. 5A, the housing 56 having an exterior 98 includes a heater cavity 102 within which the heater 100 may be provided. The fuel inlet passage 54, the regulated fuel outlet passage 62, the sense pressure passage 64, the recycle passage 68, the mixed fuel passage 78, the fuel pressure regulator 60, and the ejector 66 are all located within the exterior 98 of the housing 56. A controller 104 is in communication with the heater 100 and a temperature sensor 106. The controller 104 is programmed to command the heater 100 to heat the housing 56 to a temperature greater than freezing to thaw any ice within the housing 56, for example, during a start-up.

Figure 5B:
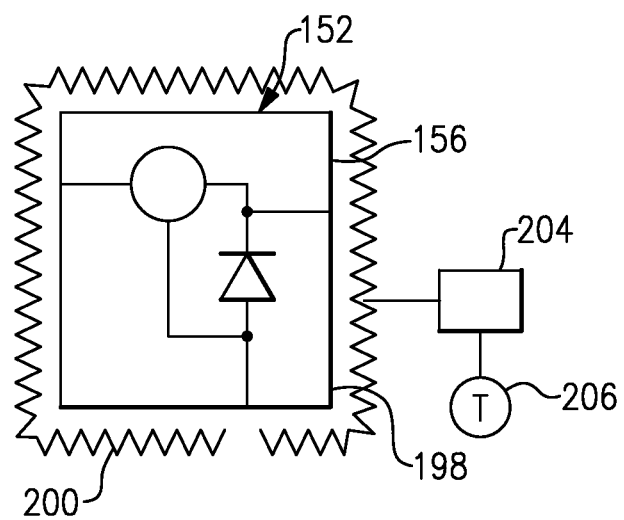
FIG. 5B is a highly schematic view of a fuel pressure regulator unit with an external heater.

Another example heating arrangement is illustrated in FIG. 5B. The fuel pressure regulator unit 152 includes a housing 156 having a heater 200 wrapped about the exterior 198 of the housing 156. A controller 204 communicates with the heater 200 and a temperature sensor 206 and operates in a manner similar to that described relative to controller 104 above.

Although an example embodiment has been disclosed, a worker of ordinary skill in this art would recognize that certain modifications would come within the scope of the claims. For that reason, the following claims should be studied to determine their true scope and content.

What is claimed is:

1. A fuel pressure regulator unit for a fuel cell comprising:
    a housing providing a fuel inlet passage, a regulated fuel outlet passage, a sense pressure passage, a recycle passage, and a mixed fuel passage;
    a pressure regulator provided in the housing and arranged fluidly between the fuel inlet passage and the regulated fuel outlet passage, the sense pressure passage fluidly interconnecting the mixed fuel passage and the pressure regulator, and the pressure regulator configured to regulate the flow of fuel from the fuel inlet passage to the regulated fuel passage in response to a pressure from the sense pressure passage;
    an ejector arranged within the housing fluidly between the regulated fuel outlet passage and the mixed fuel passage, the ejector configured to receive recycled fuel from the recycle passage; and
    a generally vertical recycle line having a first end and a second end opposite the first end, the recycle line having no 90 degree bends between the first end and the second end, the recycle line having a first recycle fitting at the first end and a second recycle fitting at the second end, wherein the first recycle fitting is connected to the housing at the recycle passage at an angle of about 45 degrees, and a passage within the second recycle fitting is connected to a manifold of the fuel cell at an angle of 45 degrees above horizontal, and
    wherein the housing includes an installed orientation in which the sense pressure passage is arranged at an oblique angle to vertical and the ejector is arranged vertically.

2. The fuel pressure regulator unit according to claim 1, comprising a heater engaging the fuel pressure regulator unit.

3. The fuel pressure regulator unit according to claim 2, wherein the housing includes a heater cavity, and the heater is arranged within the heater cavity.

4. The fuel pressure regulator unit according to claim 2, wherein the heater is wrapped around the housing.

5. The fuel pressure regulator unit according to claim 2, comprising a controller in communication with the heater and a temperature sensor, the controller programmed to command the heater in response to a freeze condition to heat the housing.

* * * * *